United States Patent
Beers et al.

(10) Patent No.: US 10,214,804 B2
(45) Date of Patent: *Feb. 26, 2019

(54) FIRST STAGE TURBINE NOZZLE WITH EROSION COATING SURFACE FINISH

(71) Applicant: Hamilton Sundstrand Corporation, Windsor Locks, CT (US)

(72) Inventors: Craig M. Beers, Wethersfield, CT (US); Kevin M. Rankin, Windsor, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 516 days.

This patent is subject to a terminal disclaimer.

(21) Appl. No.: 14/584,499

(22) Filed: Dec. 29, 2014

(65) Prior Publication Data

US 2016/0186586 A1    Jun. 30, 2016

(51) Int. Cl.
  *C23C 4/129*    (2016.01)
  *B64D 13/08*    (2006.01)
  (Continued)

(52) U.S. Cl.
  CPC .............. *C23C 4/129* (2016.01); *B22D 25/02* (2013.01); *B64D 13/02* (2013.01); *B64D 13/08* (2013.01);
  (Continued)

(58) Field of Classification Search
  CPC ........ F01D 9/045; F04D 25/04; F04D 29/321; F04D 29/325; F05D 2250/62;
  (Continued)

(56) References Cited

U.S. PATENT DOCUMENTS 5,249,934 A * 10/1993 Merritt ................... F04D 25/04
                                                          417/406
5,309,735 A    5/1994 Maher, Jr. et al.
(Continued)

FOREIGN PATENT DOCUMENTS

| CN | 1118429 A    | 3/1996  |
|----|--------------|---------|
| CN | 102286744 A  | 12/2011 |
| CN | 102562178 A  | 7/2012  |
| CN | 202348347 U  | 7/2012  |

OTHER PUBLICATIONS

First Chinese Office Action for Chinese Patent Application No. 201510696184.4, dated Feb. 24, 2018, 16 pages.

*Primary Examiner* — Dwayne J White
*Assistant Examiner* — Adam W Brown
(74) *Attorney, Agent, or Firm* — Kinney & Lange, P.A.

(57) ABSTRACT

A first stage turbine nozzle includes a first stage hub portion extending axially along a central axis, a first stage disk portion attached to the first stage hub portion and centered on the central axis, and a plurality of first stage vanes positioned radially around and attached to the first stage disk portion. Each vane extends a vane height H away from the first stage disk portion and each vane has a first end positioned at a diameter D away from the central axis. The first stage turbine nozzle also includes a plurality of first stage throats defined between radially adjacent first stage vanes. Each first stage throat has a throat width W between radially adjacent first stage vanes. The first stage turbine nozzle also includes a coating on a sidewall of each first stage vane.

2 Claims, 4 Drawing Sheets

(51) Int. Cl.
*B64D 13/02* (2006.01)
*B22D 25/02* (2006.01)
*F01D 9/04* (2006.01)
*C23C 4/06* (2016.01)
*F04D 29/32* (2006.01)
*B64D 13/06* (2006.01)
*F04D 25/04* (2006.01)

(52) U.S. Cl.
CPC .............. *C23C 4/06* (2013.01); *F01D 9/045* (2013.01); *B64D 2013/0648* (2013.01); *F04D 25/04* (2013.01); *F04D 29/321* (2013.01); *F04D 29/325* (2013.01); *F05D 2230/90* (2013.01); *F05D 2250/62* (2013.01); *F05D 2300/2263* (2013.01)

(58) Field of Classification Search
CPC ......... F05D 2300/2263; F05D 2230/90; B64D 13/08; B64D 13/02; B64D 2013/0648; B22D 25/02; C23C 4/129; C23C 4/06
See application file for complete search history.

(56) References Cited

U.S. PATENT DOCUMENTS

| | | | |
|---|---|---|---|
| 5,460,003 A * | 10/1995 | Nenov | F01D 9/045 415/186 |
| 6,257,003 B1 | 7/2001 | Hipsky | |
| 6,368,727 B1 * | 4/2002 | Ritter | C23C 4/02 427/456 |
| 6,789,315 B2 * | 9/2004 | Marques | B23P 6/002 228/119 |
| 8,113,787 B2 * | 2/2012 | Barril | F01D 5/288 416/224 |
| 8,118,561 B2 | 2/2012 | Bruce et al. | |
| 8,192,850 B2 * | 6/2012 | Brinley | C23C 4/06 428/615 |
| 2011/0312860 A1 * | 12/2011 | Mathew | C23C 4/04 508/103 |
| 2012/0156028 A1 * | 6/2012 | Colson | F01D 25/28 415/208.2 |
| 2014/0321979 A1 | 10/2014 | Beers et al. | |
| 2014/0322000 A1 * | 10/2014 | Beers | F01D 17/165 415/191 |

* cited by examiner

FIRST STAGE TURBINE NOZZLE WITH EROSION COATING SURFACE FINISH

BACKGROUND

The present disclosure relates to aircraft environmental control systems. More specifically, the present disclosure relates to a first stage turbine nozzle for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically utilize turbine nozzles that can rotate to direct air in a radial direction with respect to a main axis of the air cycle machine. Turbine nozzles are typically coated with an erosion coating to protect the turbine nozzles from damage. Erosion can be caused by particles in the air flowing through the air cycle machine. Applying a coating to the turbine nozzle will cause the coating to erode but will protect the turbine nozzle from erosion. The coating can be reapplied as needed to fill areas that have eroded to extend the life of the turbine nozzle in the air cycle machine.

Turbine nozzles are typically cast, so prior to applying a coating, turbine nozzles have to be post-processed to smooth the turbine nozzle. Post-processing can include machining or sand blasting. The coating can be applied using a number of different thermal spraying techniques, including detonation gun spraying and high velocity oxygen fuel (HVOF) spraying. Detonation gun spraying applies a coating using a detonation gun with a long water-cooled barrel. Oxygen, fuel, and powder are fed into the barrel of the detonation gun and a spark is used to ignite the oxygen and fuel mixture. This will heat the powder and accelerate the powder through and out of the barrel to be applied to a substrate. HVOF spraying applies a coating using a combustion chamber. A mixture of fuel and oxygen is fed into the combustion chamber where it is ignited and combusted continuously. The hot gas from the combustion will travel through a nozzle and a powder feed stock is fed into the gas stream in the nozzle. The powder feed stock will partially melt and will flow out of the nozzle to be deposited on a substrate.

SUMMARY

A first stage turbine nozzle includes a first stage hub portion extending axially along a central axis, a first stage disk portion attached to the first stage hub portion and centered on the central axis, and a plurality of first stage vanes positioned radially around and attached to the first stage disk portion. Each first stage vane extends a vane height H away from the first stage disk portion and each first stage vane has a first end positioned at a diameter D away from the central axis. The first stage turbine nozzle also includes a plurality of first stage throats defined between radially adjacent first stage vanes. Each first stage throat has a throat width W between radially adjacent first stage vanes. The first stage turbine nozzle also includes a coating on a sidewall of each first stage vane, wherein a surface roughness of the sidewall is between 125 and 200.

A method of coating a first stage turbine nozzle includes casting a first stage turbine nozzle with a first stage hub portion, a first stage disk portion, and a plurality of first stage vanes, and applying an erosion coating to a cast sidewall of each of the plurality of first stage vanes.

DETAILED DESCRIPTION

Figure 1:
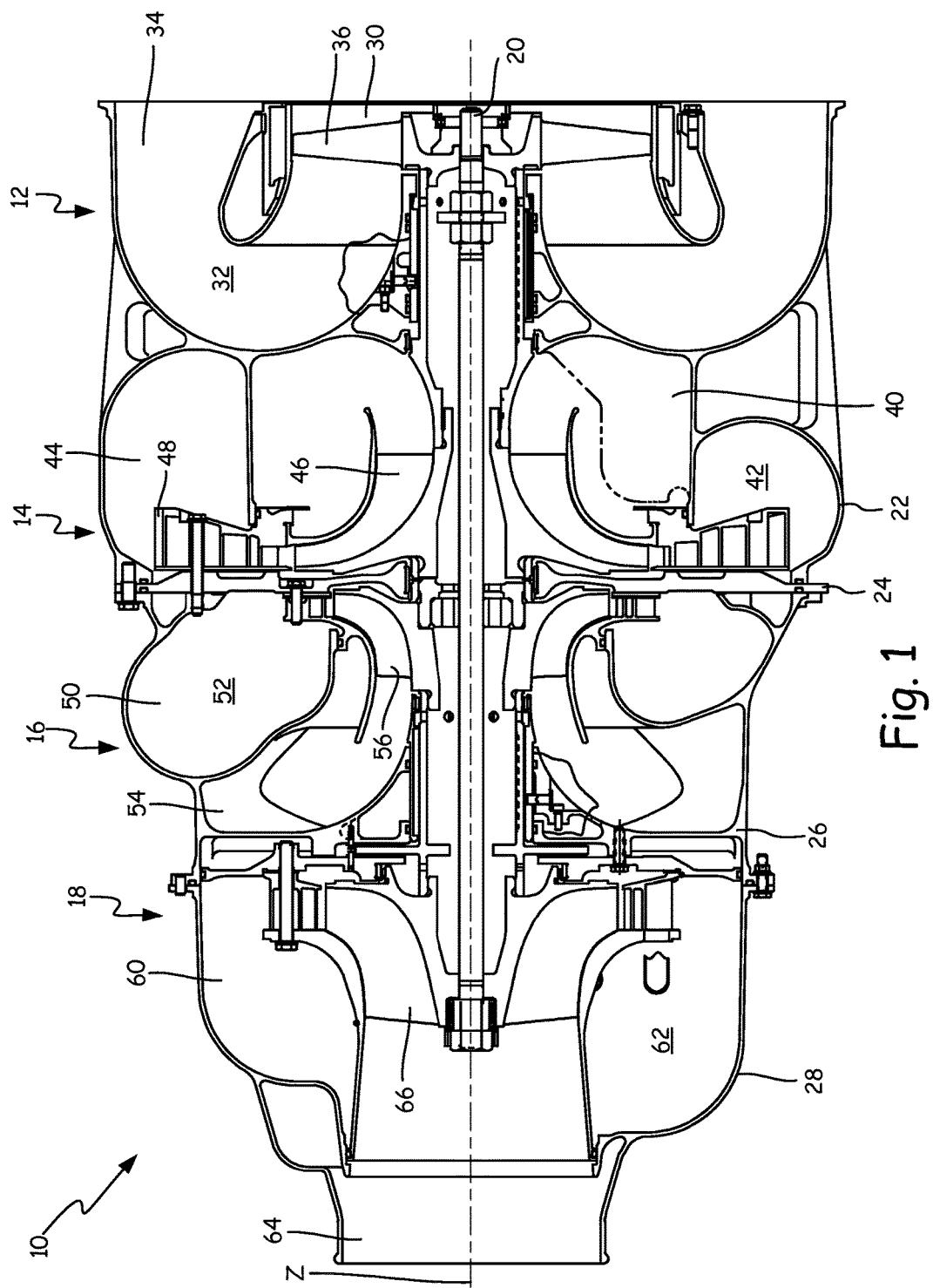
FIG. 1 is a cross-sectional view of an air cycle machine.

FIG. 1 is a cross-sectional view of air cycle machine 10, which includes fan section 12, compressor section 14, first stage turbine section 16, second stage turbine section 18, tie rod 20, fan and compressor housing 22, seal plate 24, first stage turbine housing 26, and second stage turbine housing 28. Also shown in FIG. 1 is axis Z.

Fan section 12, compressor section 14, first stage turbine section 16, and second stage turbine section 18 are all mounted on tie rod 20. Tie rod 20 rotates about axis Z. Fan and compressor housing 22 is connected to seal plate 24 and first stage turbine housing 26 with fasteners. Seal plate 24 separates flow paths in fan and compressor housing 22 from flow paths in first stage turbine housing 26. First stage turbine housing 26 is connected to second stage turbine housing 28 with fasteners. Fan and compressor housing 22, first stage turbine housing 26, and second stage turbine housing 28 together form an overall housing for air cycle machine 10. Fan and compressor housing 22 houses fan section 12 and compressor section 14, first stage turbine housing 26 housing first stage turbine section 16, and second stage turbine housing 28 houses second stage turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor nozzle 46, and diffuser 48. Air is routed into compressor inlet 40 and is ducted through compressor duct 42 to compressor outlet 44. Compressor nozzle 46 and diffuser 48 are positioned in compressor duct 42. Compressor nozzle 46 is mounted to and rotates with tie rod 20 to compress the air flowing through compressor duct 42. Diffuser 48 is a static structure through which the compressor air can flow after it has been compressed with compressor nozzle 46. Air exiting diffuser 48 can then exit compressor duct 42 through compressor outlet 44.

First stage turbine section 16 includes first stage turbine inlet 50, first stage turbine duct 52, first stage turbine outlet 54, and first stage turbine nozzle 56. Air is routed into first stage turbine inlet 50 and is ducted through first stage turbine duct 52 to first stage turbine outlet 54. First stage turbine nozzle 56 is positioned in first stage turbine duct 52 and is mounted to and rotates with tie rod 20. First stage turbine nozzle 56 will extract energy from the air passing through first stage turbine section 16 to drive rotation of tie rod 20.

Second stage turbine section 18 includes second stage turbine inlet 60, second stage turbine duct 62, second stage turbine outlet 64, and second stage turbine nozzle 66. Air is routed into second stage turbine inlet 60 and is ducted through second stage turbine duct 62 to second stage turbine outlet 64. Second stage turbine nozzle 66 is positioned in second stage turbine duct 62 and is mounted to and rotates with tie rod 20. Second stage turbine nozzle 66 will extract energy from the air passing through second stage turbine section 18 to drive rotation of tie rod 20.

Air is pulled into air cycle machine 10 with fan section 12. The air that is pulled into air cycle machine 10 can be ambient air, air from a RAM air source, or bleed air from a gas turbine engine. This air can contain particulate matter, such as water droplets, dust, or other fine particles. The air is compressed in compressor section 14 by flowing through compressor nozzle 46. The air then expands as it flows through first stage turbine nozzle 56 in first stage turbine section 16 and second stage turbine nozzle 66 in second stage turbine section 18. To drive the air, compressor nozzle 46, first stage turbine nozzle 56, and second stage turbine nozzle 66 rotate with tie rod 20. As compressor nozzle 46, first stage turbine nozzle 56, and second stage turbine nozzle 66 rotate, particulate matter in the air in air cycle machine 10 can cause erosion of compressor nozzle 46, first stage turbine nozzle 56, and second stage turbine nozzle 66. A coating is thus applied to compressor nozzle 46, first stage turbine nozzle 56, and second stage turbine nozzle 66 to prevent erosion.

Figure 2:
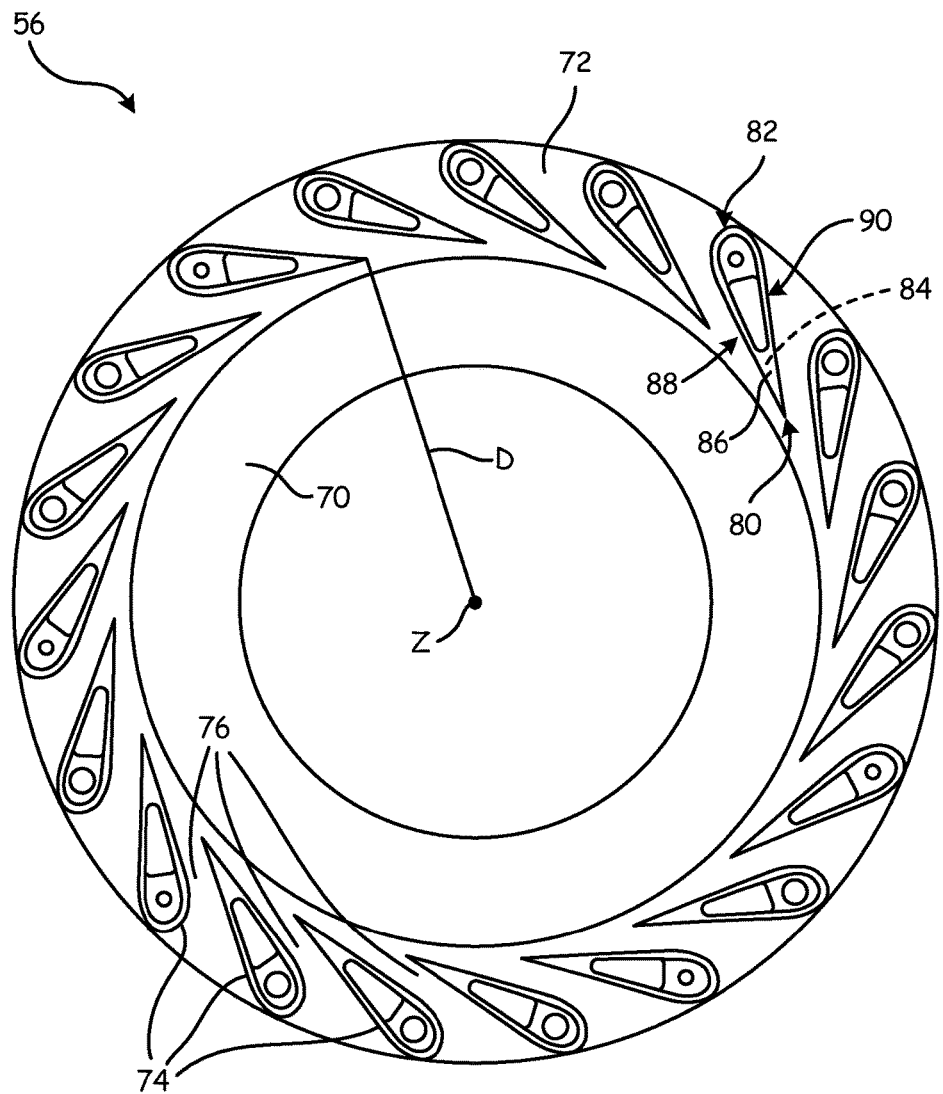
FIG. 2 is a front plan view of a first stage turbine nozzle.
Figure 3:
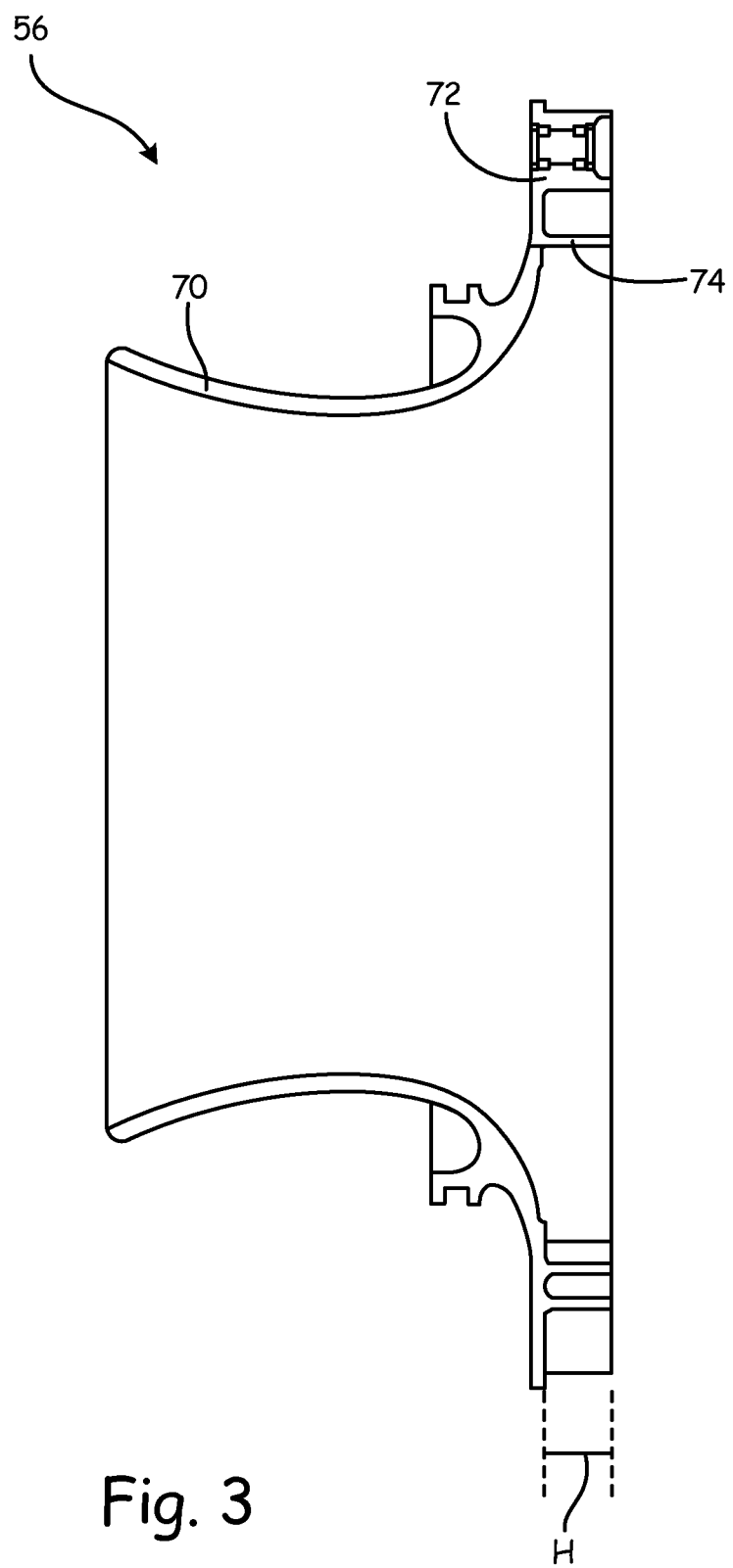
FIG. 3 is a side elevation view of the first stage turbine nozzle.
Figure 4:
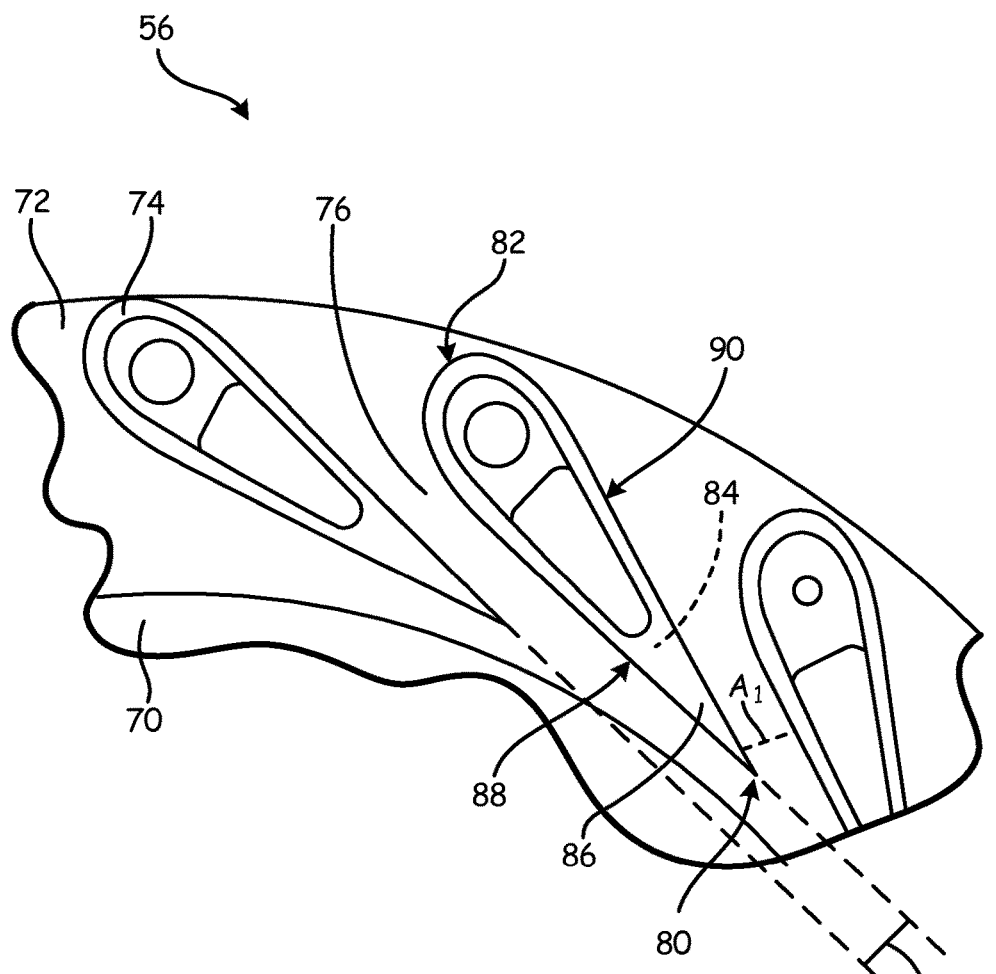
FIG. 4 is a break-away front plan view of the first stage turbine nozzle.

FIG. 2 is a front plan view of first stage turbine nozzle 56. FIG. 3 is a side elevation view of first stage turbine nozzle 56. FIG. 4 is a break-away front plan view of first stage turbine nozzle 56. First stage turbine nozzle 56 includes first stage hub portion 70, first stage disk portion 72, plurality of first stage vanes 74, and plurality of first stage throats 76. Each first stage vane 74 includes first end 80, second end 82, first face 84, second face 86, first sidewall 88, and second sidewall 90. First stage turbine nozzle 56 also includes central axis Z.

First stage turbine nozzle 56 is made out of a durable material, such as steel, aluminum, or titanium. A coating, such as tungsten carbide, is also applied to first stage turbine nozzle 56 to protect first stage turbine nozzle 56 from erosion. First stage turbine nozzle 56 includes hub portion 70, disk portion 72, plurality of vanes 74, and plurality of throats 76. Plurality of vanes 74 includes nineteen vanes.

Hub portion 70 forms a body portion of first stage turbine nozzle 56 and extends axially along central axis Z. Disk portion 72 is a disk shaped part of first stage turbine nozzle 56 that extends radially outward from central axis Z. Disk portion 72 includes a first face and a second face. The second face of disk portion 72 is connected to a first end of hub portion 70. Plurality of vanes 74 are positioned on the first face of disk portion 72 and are positioned radially around central axis Z of first stage turbine nozzle 56. Each vane 74 extends a vane height H away from the first face of disk portion 72. Vane height H is between 0.5300 inches (1.3462 centimeters) and 0.5900 inches (1.4986 centimeters). Plurality of throats 76 are defined between radially adjacent vanes 74. Each throat has a throat width W between radially adjacent vanes 74. Throat width W is between 0.2730 inches (0.6934 centimeters) and 0.3050 inches (0.7747 centimeters). First stage turbine nozzle 56 also includes a flow area A, which is the region through which the working fluid can flow. Flow area A is defined as the sum of flow areas $A_1$ in each throat 76 (flow area $A_1$ as shown in FIG. 4). Flow area $A_1$ is defined by vane height H and throat width W. Flow area A is between 2.7491 inches squared (17.7362 centimeters squared) and 3.4191 inches squared (22.0583 centimeters squared).

Each vane 74 includes first end 80 and second end 82. First end 80 is positioned radially inward and second end 82 is positioned radially outward. First ends 80 of plurality of vanes 74 are positioned diameter D away from center axis Z of first stage turbine nozzle 56. Diameter D is between 7.5980 inches (19.2989 centimeters) and 7.6780 inches (19.5021 centimeters). Each vane 74 also includes first face 84 and second face 86. First face 84 is adjacent to disk portion 72 and second face 86 is axially away from disk portion 72. Each vane 74 further includes first sidewall 88 and second sidewall 90. Both first sidewall 88 and second sidewall 90 extend from first end 80 to second end 82 of each vane 74. First sidewall 88 on one vane 74 faces second sidewall 90 on an adjacent vane 74.

Table 1 below is a list of different ratios of dimensions, including vane height H, throat width W, and diameter D.

TABLE 1

Ratios of dimensions

| Dimensions | Minimum Ratio | Maximum Ratio |
|---|---|---|
| Vane height H to throat width W | 1.7377 | 2.1612 |
| Throat width W to diameter D | 0.0356 | 0.0401 |
| Vane height H to diameter D | 0.0690 | 0.0777 |

First stage turbine nozzle 56 is manufactured using a casting process. After the casting process, first stage turbine nozzle 56 can have a surface roughness up to 200. In prior art processes, all surfaces of first stage turbine nozzle 56 had to undergo post-processing, such as machining or sand blasting, prior to applying a coating to first stage turbine nozzle 56 so that the surface roughness of first stage turbine nozzle 56 was less than 125.

Using a HVOF spraying technique to apply the coating to first stage turbine nozzle 56 allows the coating to be applied directly to parts of the cast first stage turbine nozzle 56 without post-processing. Specifically, none of first sidewalls 88 of plurality of vanes 74 need to be post-processed when a HVOF spraying process is used to apply the coating to first sidewalls 88 of plurality of vanes 74. This allows the coating to be applied when the surface roughness of first sidewalls 88 of plurality of vanes 74 is between 125 and 200. Using a HVOF spraying process allows for increased hardness in the coating and it allows for a higher percentage of tungsten carbide in the coating as opposed to other materials, such as cobalt. A HVOF spraying process also allows for greater consistency in thickness of the coating as compared to other thermal spraying techniques.

First stage turbine nozzle 56 is a high value component that is frequently replaced due to damage of first stage turbine nozzle 56. With prior manufacturing processes, every surface of first stage turbine nozzle 56 that was to be coated had to be post-processed prior to the coating being applied. Post-processing every surface of first stage turbine nozzle 56 that is to be coated is a costly and time consuming process. Specifically, plurality of throats 76 are small spaces that makes it difficult to access first sidewalls 88 of plurality of vanes 74 to machine or sand blast these surfaces. Using a HVOF spraying process to apply the coating eliminates this costly and time consuming process, as first sidewalls 88 of plurality of vanes 74 of first stage turbine nozzle 56 do not have to be post-processed prior to applying the coating. This simplifies the manufacturing process and makes first stage turbine nozzle 56 more producible and less costly and time consuming to manufacture.

Discussion of Possible Embodiments

The following are non-exclusive descriptions of possible embodiments of the present invention.

A first stage turbine nozzle includes a first stage hub portion extending axially along a central axis, a first stage disk portion attached to the first stage hub portion and centered on the central axis, and a plurality of first stage vanes positioned radially around and attached to the first stage disk portion. Each first stage vane extends a vane height H away from the first stage disk portion and each first stage vane has a first end positioned at a diameter D away from the central axis. The first stage turbine nozzle also includes a plurality of first stage throats defined between radially adjacent first stage vanes. Each first stage throat has a throat width W between radially adjacent first stage vanes. The first stage turbine nozzle also includes a coating on a sidewall of each first stage vane, wherein a surface roughness of the sidewall is between 125 and 200.

The first stage turbine nozzle of the preceding paragraph can optionally include, additionally and/or alternatively, any one or more of the following features, configurations and/or additional components:

A further embodiment of the first stage turbine nozzle, wherein the coating is a tungsten carbide coating.

A further embodiment of any of the foregoing first stage turbine nozzles, wherein the plurality of first stage vanes includes 19 vanes.

A further embodiment of any of the foregoing first stage turbine nozzles, wherein a ratio of the vane height H to the throat width W is between 1.7377 and 2.1612.

A further embodiment of any of the foregoing first stage turbine nozzles, wherein a ratio of the throat width W to the diameter D is between 0.0356 and 0.0401.

A further embodiment of any of the foregoing first stage turbine nozzles, wherein a ratio of the vane height H to the diameter D is between 0.0690 and 0.0777.

A further embodiment of any of the foregoing first stage turbine nozzles, wherein the diameter D is between 7.5980 inches (19.2989 centimeters) and 7.6780 inches (19.5021 centimeters); the vane height H is between 0.5300 inches (1.3462 centimeters) and 0.5900 inches (1.4986 centimeters); and the throat width W is between 0.2730 inches (0.6934 centimeters) and 0.3050 inches (0.7747 centimeters).

A further embodiment of any of the foregoing first stage turbine nozzles, wherein a flow area A is defined by a sum of the flow area in each first stage throat in the first stage turbine nozzle.

A further embodiment of any of the foregoing first stage turbine nozzles, wherein the flow area A is between 2.7491 inches squared (17.7362 centimeters squared) and 3.4191 inches squared (22.0583 centimeters squared).

An air cycle machine comprising a fan section with a fan rotor; a compressor section with a compressor nozzle; a first stage turbine section with any of the foregoing first stage turbine nozzles; and a second stage turbine section with a second stage turbine nozzle.

A method of coating a first stage turbine nozzle includes casting a first stage turbine nozzle with a first stage hub portion, a first stage disk portion, and a plurality of first stage vanes, and applying an erosion coating to a cast sidewall of each of the plurality of first stage vanes.

The method of the preceding paragraph can optionally include, additionally and/or alternatively, any one or more of the following features, configurations and/or additional components:

A further embodiment of the method, wherein the plurality of first stage vanes includes 19 vanes.

A further embodiment of any of the foregoing methods, wherein the cast sidewall of each of the plurality of first stage vanes has a surface roughness between 125 and 200.

A further embodiment of any of the foregoing methods, wherein applying an erosion coating to the cast sidewall is done using a high velocity oxygen fuel spraying process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of coating a first stage turbine nozzle comprising:
    casting a first stage turbine nozzle with a first stage hub portion, a first stage disk portion, and a plurality of first stage vanes, wherein the first stage hub portion extends axially away from the first stage disk portion in a first direction and the plurality of first stage vanes extend axially away from the first stage disk portion in a second direction opposite the first direction; and
    applying a tungsten carbide erosion coating directly to a cast surface of a sidewall of each of the plurality of first stage vanes using a high velocity oxygen fuel spraying process, wherein the cast surface has not undergone post-processing to reduce a surface roughness.

2. The method of claim 1, wherein the plurality of first stage vanes includes 19 vanes.

* * * * *